(12) United States Patent
Hayashi et al.

(10) Patent No.: US 9,416,716 B2
(45) Date of Patent: Aug. 16, 2016

(54) CONTROL APPARATUS FOR AN INTERNAL COMBUSTION ENGINE

(71) Applicant: Toyota Jidosha Kabushiki Kaisha, Toyota-shi Aichi-ken (JP)

(72) Inventors: Kotaro Hayashi, Mishima (JP); Tsuyoshi Obuchi, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/599,912

(22) Filed: Jan. 19, 2015

(65) Prior Publication Data

US 2015/0204228 A1 Jul. 23, 2015

(30) Foreign Application Priority Data

Jan. 20, 2014 (JP) ................................. 2014-007630

(51) Int. Cl.
| | |
|---|---|
| *F01N 11/00* | (2006.01) |
| *F01N 3/20* | (2006.01) |
| *F01N 3/08* | (2006.01) |
| *F01N 3/10* | (2006.01) |
| *F01N 13/00* | (2010.01) |

(52) U.S. Cl.
CPC .............. *F01N 11/005* (2013.01); *F01N 3/208* (2013.01); *F01N 11/002* (2013.01); *F01N 3/0842* (2013.01); *F01N 3/101* (2013.01); *F01N 13/009* (2014.06); *F01N 2550/24* (2013.01); *F01N 2560/025* (2013.01); *F01N 2560/06* (2013.01); *F01N 2560/14* (2013.01); *F01N 2900/0422* (2013.01); *F01N 2900/1628* (2013.01); *Y02T 10/22* (2013.01); *Y02T 10/24* (2013.01); *Y02T 10/47* (2013.01)

(58) Field of Classification Search
CPC ................ F01N 3/005; F01N 2550/24; F01N 2900/0422; F01N 2900/1628; F01N 11/002; F01N 11/005; F01N 2560/028; F01N 2570/22
See application file for complete search history.

(56) References Cited

U.S. PATENT DOCUMENTS

| | | |
|---|---|---|
| 2003/0172646 A1 | 9/2003 | Hiratsuka et al. |
| 2011/0143449 A1* | 6/2011 | Lana ................. F01N 11/002 436/147 |

FOREIGN PATENT DOCUMENTS

| | | |
|---|---|---|
| JP | 2003-343334 A | 12/2003 |
| JP | 2010-275947 A | 12/2010 |

OTHER PUBLICATIONS

Machine translation of JP 2010-275947A, accessed on Dec. 11, 2015.*

* cited by examiner

*Primary Examiner* — Jonathan Matthias
(74) *Attorney, Agent, or Firm* — Dinsmore & Shohl LLP

(57) ABSTRACT

In a control apparatus for an internal combustion engine in which an SCR catalyst is arranged in an exhaust passage, a dummy determination processing to determine whether the selective catalytic reduction catalyst is mounted at a location is carried out, based on a temperature difference between a temperature of exhaust gas flowing into the location where the selective catalytic reduction catalyst is to be arranged and a temperature of exhaust gas flowing out of the location, after starting of the internal combustion engine, wherein when a period of time for the temperature of the selective catalytic reduction catalyst to become equal to or less than a fixed temperature is equal to or more than a predetermined period of time, the dummy determination processing is carried out, whereas when the period of time is less than the predetermined period of time, the dummy determination processing is not carried out.

5 Claims, 6 Drawing Sheets

CONTROL APPARATUS FOR AN INTERNAL COMBUSTION ENGINE

BACKGROUND OF THE INVENTION

1. Field of the Invention

The present invention relates to a control apparatus for an internal combustion engine in which a selective catalytic reduction (SCR) catalyst is arranged in an exhaust passage.

2. Description of the Related Art

As an internal combustion engine operated by the use of a mixture with an air fuel ratio (i.e., a lean air fuel ratio) higher than a theoretical air fuel ratio, there has been known one in which a selective catalytic reduction catalyst (SCR catalyst) is arranged in an exhaust passage. In such an internal combustion engine, as a method of detecting an abnormality of the SCR catalyst, there has been known a method of determining the degree of deterioration of the SCR catalyst based on an amount of moisture which can be adsorbed by the SCR catalyst, by paying attention to the fact that there is a correlation between the amount of moisture which can be adsorbed by the SCR catalyst and the degree of deterioration of the SCR catalyst. In addition, as a method of specifying the amount of moisture which can be adsorbed by the SCR catalyst, there has been proposed one that captures or detects a phenomenon in which the temperature of an exhaust gas is decreased due to the absorption of moisture by the heat of the exhaust gas at the time when the moisture is desorbed from the selective catalytic reduction catalyst (for example, see a first patent literature).

PRIOR ART REFERENCES

Patent Literatures

[First Patent Literature] Japanese patent laid-open publication No. 2010-275947
[Second Patent Literature] Japanese patent laid-open publication No. 2003-343334

SUMMARY OF THE INVENTION

However, when the internal combustion engine is operated with the SCR catalyst being removed from an exhaust system, $NO_X$ in the exhaust gas can not be reduced in a suitable manner, so that exhaust emissions will be deteriorated. Accordingly, in cases where the SCR catalyst was removed from the exhaust system, it is also important to detect that the SCR catalyst has been removed.

On the other hand, there can be considered a method in which when the temperature of the SCR catalyst is low, like after the internal combustion engine was cold started, a comparison is made between the temperature of exhaust gas flowing upstream of the SCR catalyst (hereinafter referred to as the upstream side exhaust gas temperature) and the temperature of exhaust gas flowing downstream of the SCR catalyst (hereinafter referred to as the downstream side exhaust gas temperature).

In cases where the SCR catalyst is mounted, the heat of exhaust gas is taken up by the SCR catalyst, so that the difference between the upstream side exhaust gas temperature and the downstream side exhaust gas temperature becomes large. On the other hand, in cases where the SCR catalyst is not mounted, the heat of the exhaust gas is not taken up by the SCR catalyst, the difference between the upstream side exhaust gas temperature and the downstream side exhaust gas temperature becomes small. Accordingly, there can be considered that in cases where the difference between the upstream side exhaust gas temperature and the downstream side exhaust gas temperature is smaller than a threshold value, a determination is made that the SCR catalyst has been removed.

Here, when the temperature of the SCR catalyst is low, the SCR catalyst has a characteristic of adsorbing moisture in the exhaust gas and atmospheric air. For example, when the temperature of the SCR catalyst becomes low during the operation of the internal combustion engine is stopped, the SCR catalyst adsorbs the moisture contained in the atmospheric air in the exhaust passage. In addition, when the temperature of the SCR catalyst is low after the internal combustion engine is started, the SCR catalyst adsorbs the moisture contained in the exhaust gas.

When the SCR catalyst adsorbs moisture, heat of adsorption reaction occurs. For that reason, when a phenomenon has evolved or occurred in which the SCR catalyst adsorbs the moisture in the exhaust gas after the starting of the internal combustion engine, the downstream side exhaust gas temperature will be made to rise by means of the heat of adsorption reaction. As a result, the difference between the upstream side exhaust gas temperature and the downstream side exhaust gas temperature may become small, or the downstream side exhaust gas temperature may become higher than the upstream side exhaust gas temperature. When the determination processing as referred to above is carried out at the time of occurrence of such a phenomenon, an incorrect determination may be made that the SCR catalyst has been removed, in spite of the fact that the SCR catalyst is mounted.

The present invention has been made in view of the actual circumstances as referred to above, and the object of the invention is to prevent an incorrect determination at the time of determining whether an SCR catalyst has been removed in a control apparatus for an internal combustion engine in which the SCR catalyst is to be arranged in an exhaust passage.

According to the present invention, in order to achieve the above-mentioned object, the above-mentioned determination is not carried out, when it is considered that an SCR catalyst is in a state where it adsorbs moisture in exhaust gas, in a control apparatus for an internal combustion engine in which it is determined, based on an upstream side exhaust gas temperature and a downstream side exhaust gas temperature, whether the SCR catalyst has been removed.

Specifically, a control apparatus for an internal combustion engine according to the present invention includes:

an upstream side temperature detection unit that detects a temperature of exhaust gas flowing into a location where a selective catalytic reduction catalyst is to be arranged in an exhaust passage of the internal combustion engine;

a downstream side temperature detection unit that detects a temperature of exhaust gas flowing out of the location where the selective catalytic reduction catalyst is to be arranged in the exhaust passage of the internal combustion engine; and a determination unit that carries out dummy determination processing to determine whether the selective catalytic reduction catalyst is mounted at said location, based on a parameter correlated with a temperature difference between the temperature measured by said upstream side temperature detection unit and the temperature measured by said downstream side temperature detection unit after starting of the internal combustion engine;

wherein said determination unit carries out said dummy determination processing, when a period of time for the temperature of said selective catalytic reduction catalyst to become equal to or less than a fixed temperature in a period of time from the last stop of the internal combustion engine to the current starting thereof is equal to or larger than a predetermined period of time, but does not carry out said dummy determination processing, when the period of time for the temperature of said selective catalytic reduction catalyst to become equal to or less than the fixed temperature is less than said predetermined period of time.

The term or expression "a parameter correlated with a temperature difference between the temperature measured by said upstream side temperature detection unit and the temperature measured by said downstream side temperature detection unit after the starting of the internal combustion engine" referred to herein means, for example, a temperature difference which is obtained by subtracting a temperature detected by a upstream side exhaust gas temperature detection unit from a temperature detected by a downstream side exhaust gas temperature detection unit, or a ratio of the temperature detected by the downstream side exhaust gas temperature detection unit with respect to the temperature detected by the upstream side exhaust gas temperature detection unit.

In cases where the selective catalytic reduction catalyst (the SCR catalyst) is arranged at a location at which the SCR catalyst is to be arranged in the exhaust passage, the heat of the exhaust gas is taken up by the SCR catalyst, so that the temperature measured by the downstream side temperature detection unit (the downstream side exhaust gas temperature) becomes lower than the temperature measured by the upstream side temperature detection unit (the upstream side exhaust gas temperature). In particular, when the temperature of the SCR catalyst is low after the starting of the internal combustion engine, the amount of heat to be conducted from the exhaust gas to the SCR catalyst is large, and hence, the temperature difference between the upstream side exhaust gas temperature and the downstream side exhaust gas temperature becomes large, or the ratio of the downstream side exhaust gas temperature with respect to the upstream side exhaust gas temperature becomes small.

On the other hand, in cases where the SCR catalyst is not arranged at a location at which the SCR catalyst is to be arranged in the exhaust passage (in cases where the SCR catalyst is removed), the heat of the exhaust gas is not taken up by the SCR catalyst, and hence, an amount of decrease of the downstream side exhaust gas temperature with respect to the upstream side exhaust gas temperature decreases. As a result, the temperature difference between the upstream side exhaust gas temperature and the downstream side exhaust gas temperature becomes small, or the ratio of the downstream side exhaust gas temperature with respect to the upstream side exhaust gas temperature becomes large.

Accordingly, in cases where the temperature difference between the upstream side exhaust gas temperature and the downstream side exhaust gas temperature after the starting of the internal combustion engine is smaller than the threshold value, or in cases where the ratio of the downstream side exhaust gas temperature with respect to the upstream side exhaust gas temperature is larger than the threshold value, it can be determined that the SCR catalyst is not mounted at the location at which the SCR catalyst is to be arranged in the exhaust passage.

However, in cases where the SCR catalyst is arranged at the location at which the SCR catalyst is to be arranged in the exhaust passage, the moisture contained in the residual exhaust gas and atmospheric air in the exhaust passage is adsorbed to the SCR catalyst during the stop of operation of the internal combustion engine. The longer the period of time in which the operation of the internal combustion engine is stopped, the larger becomes the amount of moisture adsorption of the SCR catalyst. However, there is a limitation in the amount of moisture which can be adsorbed by the SCR catalyst, so when the stop period of time of the internal combustion engine becomes long to some extent, the moisture adsorption capacity of the SCR catalyst will be saturated.

In cases where the internal combustion engine is started before the moisture adsorption capacity of the SCR catalyst is saturated, a phenomenon evolves or occurs in which the SCR catalyst adsorbs moisture in the exhaust gas after the starting of the internal combustion engine. When the SCR catalyst adsorbs the moisture in the exhaust gas, the exhaust gas is warmed by the heat of adsorption reaction. For that reason, there will be a possibility that the amount of decrease of the downstream side exhaust gas temperature with respect to the upstream side exhaust gas temperature may become small, or the downstream side exhaust gas temperature may become higher than the upstream side exhaust gas temperature. As a result, even in the case where the SCR catalyst is mounted in the exhaust passage, the temperature difference between the upstream side exhaust gas temperature and the downstream side exhaust gas temperature may become smaller than the threshold value, or the ratio of the downstream side exhaust gas temperature with respect to the upstream side exhaust gas temperature may become larger than the threshold value.

On the other hand, in cases where the internal combustion engine is started after the moisture adsorption capacity of the SCR catalyst has been saturated, there will not occur the phenomenon in which the SCR catalyst adsorbs the moisture in the exhaust gas after the starting of the internal combustion engine, but a phenomenon will instead occur in which moisture desorbs from the SCR catalyst. When moisture desorbs from the SCR catalyst, the moisture absorbs the heat of the exhaust gas. For that reason, the amount of decrease of the downstream side exhaust gas temperature with respect to the upstream side exhaust gas temperature becomes large. As a result, in cases where the SCR catalyst is mounted in the exhaust passage, the temperature difference between the upstream side exhaust gas temperature and the downstream side exhaust gas temperature becomes larger, or the ratio of the downstream side exhaust gas temperature with respect to the upstream side exhaust gas temperature becomes smaller, in comparison with the case where the SCR catalyst is not mounted.

Accordingly, it is desirable to carry out the dummy determination processing when it is considered that the moisture adsorption capacity of the SCR catalyst to be arranged in the exhaust passage is saturated. Stated in another way, it is desirable not to carry out the dummy determination processing when it is estimated that the moisture adsorption capacity of the SCR catalyst to be arranged in the exhaust passage is not saturated.

In contrast to this, according to the control apparatus for an internal combustion engine in the present invention, when the period of time for the temperature of the SCR catalyst to become equal to or less than the fixed temperature in the period of time from the last stop of the internal combustion engine to the current starting thereof is equal to or larger than the predetermined period of time, the dummy determination processing is carried out, whereas when said period of time is less than the predetermined period of time, the dummy determination processing is no longer carried out.

The "fixed temperature" and the "predetermined period of time" referred to herein are set as a temperature and a period of time, respectively, at and in which it is considered that when the period of time for the temperature of the selective catalytic reduction catalyst to become equal to or less than the fixed temperature becomes equal to or larger than the predetermined period of time, the moisture adsorption capacity of the selective catalytic reduction catalyst is saturated. For example, the "fixed temperature" is a maximum value (e.g., 50 degrees C.) of a temperature range in which the SCR catalyst is able to adsorb moisture. In addition, the "predetermined period of time" is a period of time taken until the moisture adsorption capacity of the SCR catalyst is saturated, when the temperature of the SCR catalyst is equal to or less than the fixed temperature.

According to such a construction, the dummy determination processing is no longer carried out, in cases where the downstream side exhaust gas temperature may be made high due to the moisture adsorption reaction of the SCR catalyst (in cases where the temperature difference between the upstream side exhaust gas temperature and the downstream side exhaust gas temperature may become small, or in cases where the ratio of the downstream side exhaust gas temperature with respect to the upstream side exhaust gas temperature may become large). As a result, it is possible to prevent an incorrect determination from being made that the SCR catalyst has been removed, in spite of the fact that the SCR catalyst is mounted.

In addition, when it is considered that the moisture adsorption capacity of the SCR catalyst to be arranged in the exhaust passage is saturated, there appears a remarkable difference between the temperature difference or the ratio in the case where the SCR catalyst is mounted and the temperature difference or the ratio in the case where the SCR catalyst is removed. When the dummy determination processing is carried out in such a case, the accuracy in the determination of the dummy determination processing can be enhanced.

Here, note that the selective catalytic reduction catalyst may have adsorbed moisture, at the time when the operation of the internal combustion engine is stopped. In cases where the selective catalytic reduction catalyst has adsorbs moisture at the time of the stop of operation of the internal combustion engine, the period of time taken until the moisture adsorption capacity of the selective catalytic reduction catalyst is saturated becomes shorter in comparison with the case where the selective catalytic reduction catalyst has not adsorbed moisture. Accordingly, said predetermined period of time may be changed according to the amount of moisture adsorption of the selective catalytic reduction catalyst at the time of the stop of operation of the internal combustion engine (hereinafter referred to as the "amount of moisture adsorption at the time of engine stop").

Here, note that the amount of moisture adsorption at the time of engine stop is correlated with the temperature of the selective catalytic reduction catalyst at the time of the stop of operation of the internal combustion engine. For that reason, the amount of moisture adsorption at the time of engine stop can be obtained based on the temperature of the selective catalytic reduction catalyst at the time of the stop of operation of the internal combustion engine. Then, the predetermined period of time need only be set based on a difference which is obtained by subtracting the amount of moisture adsorption at the time of engine stop from an amount of moisture adsorption at which the moisture adsorption capacity of the selective catalytic reduction catalyst is saturated (hereinafter referred to as a "saturation amount of adsorption"). In addition, the predetermined period of time may be changed according to the temperature of the selective catalytic reduction catalyst at the time of the stop of operation of the internal combustion engine.

According to the present invention, in a control apparatus for an internal combustion engine in which an SCR catalyst is to be arranged in an exhaust passage, it is possible to prevent an incorrect determination at the time of determining whether the SCR catalyst has been removed.

Further features of the present invention will become apparent from the following description of exemplary embodiments with reference to the attached drawings.

DESCRIPTION OF THE EMBODIMENT

Hereinafter, a specific embodiment of the present invention will be described based on the attached drawings. However, the dimensions, materials, shapes, relative arrangements and so on of component parts described in this embodiment are not intended to limit the technical scope of the present invention to these alone in particular as long as there are no specific statements.

Figure 1:
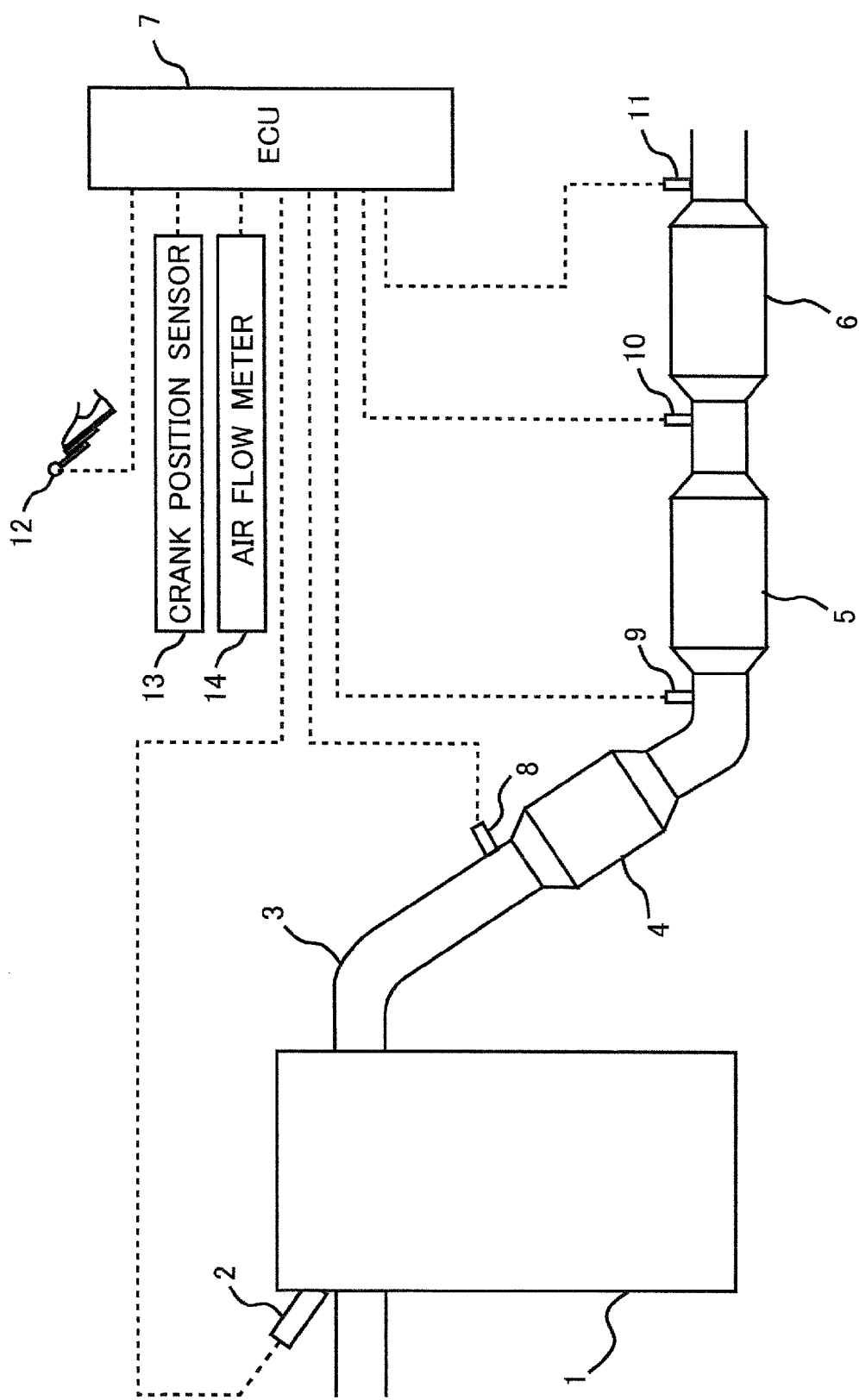
FIG. 1 is a view showing the schematic construction of an internal combustion engine and its exhaust system, to which the present invention is applied.

FIG. 1 is a view showing the schematic construction of an internal combustion engine and its exhaust system, to which the present invention is applied. The internal combustion engine 1 shown in FIG. 1 is a spark ignition type internal combustion engine (gasoline engine) which is able to be operated with a mixture having a fuel air ratio (a lean air fuel ratio) higher than a theoretical air fuel ratio. Here, note that the internal combustion engine 1 may be a compression ignition type internal combustion engine in which a lean burn operation is carried out.

The internal combustion engine 1 is provided with a fuel injection valve 2. The fuel injection valve 2 may be a valve mechanism which serves to inject fuel into an intake passage (e.g., an intake port), or may be a valve mechanism which serves to inject fuel into a cylinder.

An exhaust passage 3 is connected to the internal combustion engine 1. The exhaust passage 3 is a passage through which a gas (an exhaust gas) burned in the interior of the cylinder of the internal combustion engine 1 flows. A first catalyst casing 4 is arranged in the middle of the exhaust passage 3. The first catalyst casing 4 receives a three-way catalyst which is composed of a honeycomb structured body covered with a coat layer such as alumina, and a precious metal (e.g., platinum, palladium, or rhodium, etc.) supported by the coat layer.

A second catalyst casing 5 is arranged in the exhaust passage 3 at the downstream side of the first catalyst casing 4. The second catalyst casing 5 receives an occlusion or storage reduction catalyst (NSR catalyst) which is composed of a honeycomb structured body covered with a coat layer such as alumina, a precious metal (platinum, palladium, rhodium, etc.) supported by the coat layer, and an $NO_X$ occlusion or storage agent (alkalines, alkaline earths, etc.) supported by the coat layer.

A third catalyst casing 6 is arranged in the exhaust passage 3 at the downstream side of the second catalyst casing 5. The third catalyst casing 5 receives a selective reduction catalyst (SCR catalyst) which is composed of a honeycomb structured body made of cordierite or Fe—Cr—Al based heat resisting steel, a zeolite based coat layer covering the honeycomb structured body, and a precious metal (platinum, palladium, etc.) supported by the coat layer.

An ECU 7 is provided in combination with the internal combustion engine 1 as constructed in this manner. The ECU 7 is an electronic control unit which is composed of a CPU, a ROM, a RAM, a backup RAM, and so on. The ECU 7 is electrically connected to various kinds of sensors such as an air fuel ratio sensor (A/F sensor) 8, an oxygen concentration sensor (oxygen sensor) 9, an upstream side exhaust gas temperature sensor 10, a downstream side exhaust gas temperature sensor 11, a accelerator position sensor 12, a crank position sensor 13, an air flow meter 14, and so on.

The air fuel ratio sensor 8 is mounted on the exhaust passage 3 at a location upstream of the first catalyst casing 4, and outputs an electric signal correlated with an air fuel ratio of the exhaust gas which flows into the first catalyst casing 4. The oxygen concentration sensor 9 is mounted on the exhaust passage 3 at a location between the first catalyst casing 4 and the second catalyst casing 5, and outputs an electric signal correlated with a concentration of oxygen contained in the exhaust gas which flows out from the first catalyst casing 4. The upstream side exhaust gas temperature sensor 10, corresponding to an upstream side exhaust gas temperature detection unit according to the present invention, is mounted on the exhaust passage 3 at a location between the second catalyst casing 5 and the third catalyst casing 6, and outputs an electric signal correlated with a temperature of the exhaust gas which flows out from the second catalyst casing 5 (i.e., a temperature of the exhaust gas which flows into the third catalyst casing 6). The downstream side exhaust gas temperature sensor 11, corresponding to a downstream side exhaust gas temperature detection unit according to the present invention, is mounted on the exhaust passage 3 at a location downstream of the third catalyst casing 6, and outputs an electric signal correlated with a temperature of the exhaust gas which flows out from the third catalyst casing 6. The accelerator position sensor 12 outputs an electric signal correlated with an amount of operation of an accelerator pedal (i.e., a degree of opening of an accelerator). The crank position sensor 13 outputs an electric signal correlated with a rotational position of an output shaft (crankshaft) of the internal combustion engine 1. The air flow meter 14 outputs an electric signal correlated with an amount of air (i.e., an amount of intake air) sucked into the cylinder of the internal combustion engine 1.

The ECU 7 controls the operating state of the internal combustion engine 1 based on the output signals of the above-mentioned variety of kinds of sensors. For example, the ECU 7 calculates a target air fuel ratio of the mixture based on an engine rotational speed calculated based on the output signal of the crank position sensor 13, and the output signal of the accelerator position sensor 12 (the accelerator opening degree). The ECU 7 calculates a target amount of fuel injection (a fuel injection period) of the fuel injection valve 2 based on the target air fuel ratio and the output signal of the air flow meter 14 (the amount of intake air), and operates the fuel injection valve 2 according to the target amount of fuel injection thus calculated.

Here, note that the ECU 7 sets the target air fuel ratio to a lean air fuel ratio which is higher than the theoretical air fuel ratio, in cases where the operating state of the internal combustion engine 1 is in a low rotation and low load region or in a middle rotation and middle load region. In addition, the ECU 7 sets the target air fuel ratio to the theoretical air fuel ratio or a rich air fuel ratio which is lower than the theoretical air fuel ratio, in cases where the operating state of the internal combustion engine 1 is in a high load region or a high rotation region. Thus, when the operating state of the internal combustion engine 1 belongs to the low rotation and low load region or the middle rotation and middle load region (hereinafter, these operating regions being referred to as a "lean operating region"), the amount of fuel consumption can be suppressed to a low level by carrying out the lean burn operation of the internal combustion engine 1. Moreover, the ECU 7 carries out air fuel ratio feedback control in which the target amount of fuel injection is corrected so that the output signal of the air fuel ratio sensor 8 coincides with the target air fuel ratio, learning control of correction coefficients used for the air fuel ratio feedback control based on the output signal of the oxygen concentration sensor 9, etc.

However, in cases where the target air fuel ratio is set to a lean air fuel ratio (in cases where the lean burn operation of the internal combustion engine 1 is carried out), the $NO_X$ purification (removal) performance of the three-way catalyst received in the first catalyst casing 4 becomes low. For that reason, in cases where the target air fuel ratio is set to the lean air fuel ratio, it is necessary to remove or reduce $NO_X$ in the exhaust gas by means of the NSR catalyst of the second catalyst casing 5, and the SCR catalyst of the third catalyst casing 6.

The NSR catalyst stores or adsorbs $NO_X$ in the exhaust gas, when the oxygen concentration of the exhaust gas flowing into the second catalyst casing 5 is high (i.e., when the air fuel ratio of the exhaust gas is lean). When the oxygen concentration of the exhaust gas flowing into the second catalyst casing 5 is low, and when reducing components such as hydrocarbon (HC), carbon monoxide (CO), etc., are contained in the exhaust gas (i.e., when the air fuel ratio of the exhaust gas is rich), the NSR catalyst releases the $NO_X$ stored in the NSR catalyst, so that the $NO_X$ thus released is made to be reduced to nitrogen ($N_2$).

Accordingly, the ECU 7 carries out rich spike processing in a periodic manner in the lean operation region. The rich spike processing is to adjust the amount of fuel injection and/or the amount of intake air in such a manner that the concentration of oxygen in the exhaust gas becomes low and the concentrations of HC and CO become high. The rich spike processing may be carried out, when the amount of $NO_X$ stored in the NSR catalyst becomes equal to or larger than a fixed amount, or when the operation time of the internal combustion engine 1 from the last end time of the rich spike processing (preferably, the operation time in which the target air fuel ratio has been set to the lean air fuel ratio) becomes equal to or more than a fixed period of time, or when the travel distance of a vehicle, on which the internal combustion engine 1 is mounted, from the last end time of the rich spike processing (preferably, the travel distance within which the target air fuel ratio has been set to the lean air fuel ratio) becomes equal to or more than a fixed distance. As a specific implementation method of the rich spike processing, there can be used at least one of the following processings: that is, the processing of increasing the amount of fuel injection of the fuel injection valve 2, and the processing of decreasing the degree of opening of an intake throttle valve (a throttle valve). Here, note that in the construction in which the fuel injection valve 2 injects fuel directly into the cylinder, the rich spike processing may be carried out by a method of injecting fuel from the fuel injection valve 2 in the exhaust stroke of the cylinder.

The SCR catalyst adsorbs ammonia ($NH_3$) contained in the exhaust gas. The SCR catalyst reduces $NO_X$ to nitrogen ($N_2$) by causing $NH_3$ adsorbed to the SCR catalyst and $NO_X$ in the exhaust gas to react with each other. Here, note that $NH_3$ to be supplied to the SCR catalyst is generated in the three-way catalyst or the NSR catalyst. For example, in cases where the rich spike processing is carried out, in the three-way catalyst, a part of $NO_X$ therein is reduced to $NH_3$, and in the NSR catalyst, a part of $NO_X$ having flowed out of the NSR catalyst is reduced to $NH_3$. At that time, the amount of $NH_3$ generated in the NSR catalyst changes according to the interval in which the rich spike processing is carried out, the air fuel ratio at the time when the rich spike processing is carried out, etc. Accordingly, in cases where $NH_3$ is supplied to the SCR catalyst, the interval of execution of the rich spike processing may be set to an interval suitable for generation of $NH_3$, or the air fuel ratio at the time of execution of the rich spike processing may be set to an air fuel ratio (e.g., 14.1 or thereabout) suitable for generation of $NH_3$.

By the execution of the rich spike processing as referred to above, even in cases where the lean burn operation of the internal combustion engine 1 is carried out, $NO_X$ in the exhaust gas can be reduced or removed. However, in cases where the SCR catalyst was removed from the exhaust passage 3 as in the case where a casing or an exhaust pipe having not received the SCR catalyst therein is arranged in the exhaust passage 3 instead of the third catalyst casing 6, the $NO_X$ having flowed out of the NSR catalyst is discharged into the ambient atmosphere, without being reduced, so that exhaust emission is deteriorated. Accordingly, in cases where the SCR catalyst was removed from the exhaust passage 3, it is necessary to quickly detect that the SCR catalyst was removed, and to turn on an alarm light or the like.

Hereinafter, reference will be made to processing (i.e., dummy determination processing) in which it is determined whether the SCR catalyst has been removed from the exhaust passage 3. The dummy determination processing is to calculate a temperature difference between a measured value of the upstream side exhaust gas temperature sensor 10 (i.e., an upstream side exhaust gas temperature) and a measured value of the downstream side exhaust gas temperature sensor 11 (i.e., a downstream side exhaust gas temperature), when the temperature of the SCR catalyst to be arranged in the exhaust passage 3 is low after the starting of the internal combustion engine 1 (e.g., when the temperature of the SCR catalyst is lower than the temperature of the exhaust gas), and to make a determination that when the temperature difference is less than the threshold value, the SCR catalyst has been removed.

In cases where the third catalyst casing 6 receiving the SCR catalyst therein is arranged in the exhaust passage 3, the heat of exhaust gas is taken up by the SCR catalyst, so that the downstream side exhaust gas temperature becomes lower than the upstream side exhaust gas temperature. In particular, when the temperature of the SCR catalyst is low as immediately after the cold starting of the internal combustion engine 1, the amount of heat to be conducted from the exhaust gas to the SCR catalyst becomes large, and hence, the temperature difference between the upstream side exhaust gas temperature and the downstream side exhaust gas temperature becomes large.

On the other hand, in cases where the third catalyst casing 6 receiving the SCR catalyst therein is not arranged in the exhaust passage 3, the heat of exhaust gas is not taken up by the SCR catalyst, so that an amount of decrease of the downstream side exhaust gas temperature with respect to the upstream side exhaust gas temperature becomes small. As a result, the temperature difference between the upstream side exhaust gas temperature and the downstream side exhaust gas temperature becomes small.

Accordingly, in cases where the temperature difference between the upstream side exhaust gas temperature and the downstream side exhaust gas temperature is smaller than the threshold value, a determination can be made that the third catalyst casing 6 receiving the SCR catalyst therein is not arranged in the exhaust passage 3 (i.e., the SCR catalyst has been removed from the exhaust passage 3).

However, the SCR catalyst has a characteristic of adsorbing moisture contained in the residual exhaust gas and the atmospheric air in the exhaust passage 3 during the stop of operation of the internal combustion engine 1. In particular, in cases where the SCR catalyst contains zeolite based materials, the moisture contained in the residual exhaust gas or the atmospheric air is adsorbed to the SCR catalyst, even under the condition that the amount of moisture contained in the residual exhaust gas or the atmospheric air is small. However, there is a limitation in the moisture adsorption capacity of the SCR catalyst, so when the stop period of time of the internal combustion engine becomes long, the moisture adsorption capacity of the SCR catalyst will be saturated.

In cases where the internal combustion engine 1 is started before the moisture adsorption capacity of the SCR catalyst is saturated, a phenomenon evolves or occurs in which the SCR catalyst adsorbs moisture in the exhaust gas after the starting of the internal combustion engine 1. When the SCR catalyst adsorbs the moisture in the exhaust gas, the exhaust gas is warmed by the heat of adsorption reaction. For that reason, there will be a possibility that the amount of decrease of the downstream side exhaust gas temperature with respect to the upstream side exhaust gas temperature may become small, or the downstream side exhaust gas temperature may become higher than the upstream side exhaust gas temperature. As a result, even in cases where the third catalyst casing 6 receiving the SCR catalyst therein is arranged in the exhaust passage 3, there will be a possibility that the temperature difference between the upstream side exhaust gas temperature and the downstream side exhaust gas temperature may become smaller than the threshold value. In that case, an incorrect determination may be made that the SCR catalyst has been removed, in spite of the fact that the SCR catalyst has not been removed.

On the other hand, in cases where the internal combustion engine 1 is started after the moisture adsorption capacity of the SCR catalyst has been saturated, there will not occur the phenomenon in which the SCR catalyst adsorbs the moisture in the exhaust gas after the starting of the internal combustion engine 1, but a phenomenon will instead occur in which moisture desorbs from the SCR catalyst. When moisture desorbs from the SCR catalyst, the moisture absorbs the heat of the exhaust gas. For that reason, the amount of decrease of the downstream side exhaust gas temperature with respect to the upstream side exhaust gas temperature becomes large. As a result, in cases where the third catalyst casing 6 receiving the SCR catalyst therein is arranged in the exhaust passage 3, the temperature difference between the upstream side exhaust gas temperature and the downstream side exhaust gas temperature becomes larger in comparison with the case where the third catalyst casing 6 is not arranged in the exhaust passage 3.

Accordingly, in this embodiment, the ECU 7 carries out the dummy determination processing in cases where it is estimated that the moisture adsorption capacity of the SCR catalyst is saturated at the point in time when the internal combustion engine 1 is started, but does not carry out the dummy determination processing in cases where it is estimated that the moisture adsorption capacity of the SCR catalyst is not saturated at the point in time when the internal combustion engine 1 is started.

If the dummy determination processing is carried out according to such a condition, the dummy determination processing will no longer be carried out, when the downstream side exhaust gas temperature is made high due to moisture adsorption reaction (i.e., when the temperature difference between the upstream side exhaust gas temperature and the downstream side exhaust gas temperature becomes small). As a result, it is possible to prevent an incorrect determination that the SCR catalyst has been removed, in spite of the fact that the third catalyst casing 6 receiving the SCR catalyst therein is arranged in the exhaust passage 3.

On the other hand, when the dummy determination processing is carried out at the time of estimating that the moisture adsorption capacity of the SCR catalyst is saturated, there appears a remarkable difference between a temperature difference in the case where the third catalyst casing 6 receiving the SCR catalyst therein is arranged in the exhaust passage 3, and a temperature difference in the case where the third catalyst casing 6 is not arranged in the exhaust passage 3. As a result, the determination accuracy of the dummy determination processing can be enhanced.

Next, reference will be made to a method of determining whether the moisture adsorption capacity of the SCR catalyst is saturated at the point in time when the internal combustion engine 1 is started. When the temperature of the SCR catalyst is equal to or less than a fixed temperature (e.g., 50 degrees C.), the moisture adsorption capacity of the SCR catalyst is active (activated). That is, when the temperature of the SCR catalyst is equal to or less than the fixed temperature, the SCR catalyst adsorbs moisture in the residual exhaust gas or the atmospheric air. Here, note that in the following, the fixed temperature is referred to as a "moisture adsorption temperature".

Figure 2:
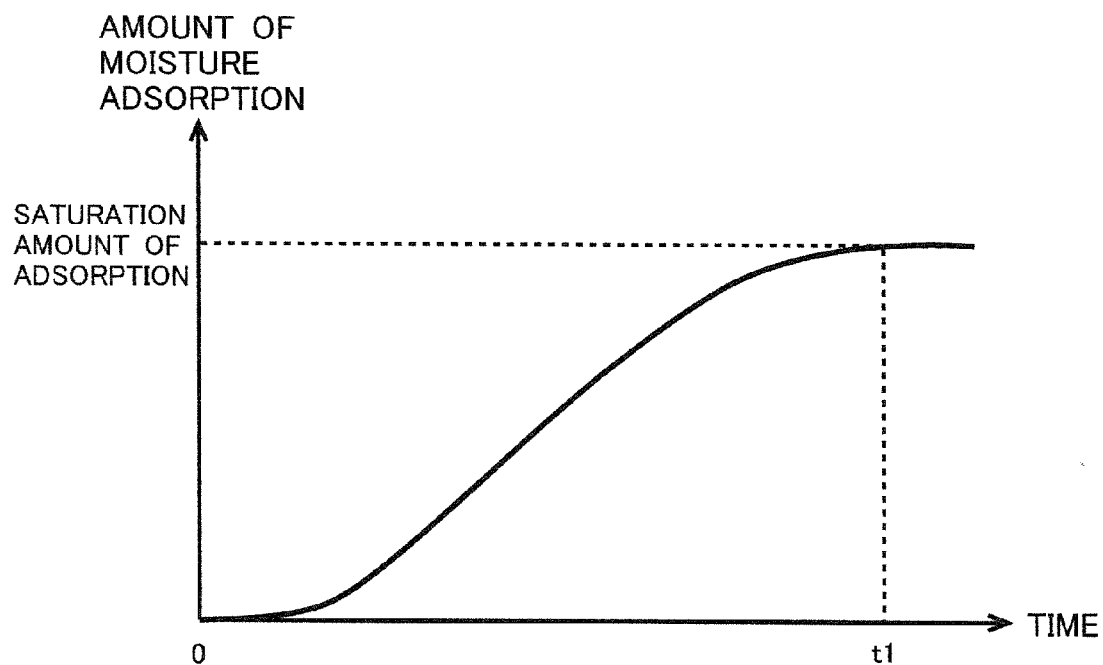
FIG. 2 is a view showing the change over time of an amount of moisture adsorption of an SCR catalyst, in cases where the temperature of the SCR catalyst is equal to or less than a moisture adsorption temperature.

FIG. 2 is a view showing the change over time of an amount of moisture adsorption of the SCR catalyst, in cases where the temperature of the SCR catalyst is equal to or less than the moisture adsorption temperature. As shown in FIG. 2, in cases where the temperature of the SCR catalyst is equal to or less than the moisture adsorption temperature, the amount of moisture adsorption of the SCR catalyst increases with the passage of time. Then, after the amount of moisture adsorption of the SCR catalyst reaches a saturation amount of adsorption (an amount of moisture adsorption at the time when the moisture adsorption capacity of the SCR catalyst is saturated) (i.e., after t1 in FIG. 2), the amount of moisture adsorption of the SCR catalyst remains the same as the saturation amount of adsorption.

Accordingly, a period of time (hereinafter referred to as a "saturation period of time") taken for the amount of moisture adsorption of the SCR catalyst to reach the saturation amount of adsorption has been obtained in advance, and when a period of time (hereinafter referred to as an "adsorption period of time") in which the temperature of the SCR catalyst has become equal to or less than the moisture adsorption temperature during the stop of operation of the internal combustion engine 1 is equal to or larger than the saturation period of time, it is estimated that the moisture adsorption capacity of the SCR catalyst is saturated, whereas when the adsorption period of time is less than the saturation period of time, it can be estimated that the moisture adsorption capacity of the SCR catalyst is not saturated.

Figure 3:
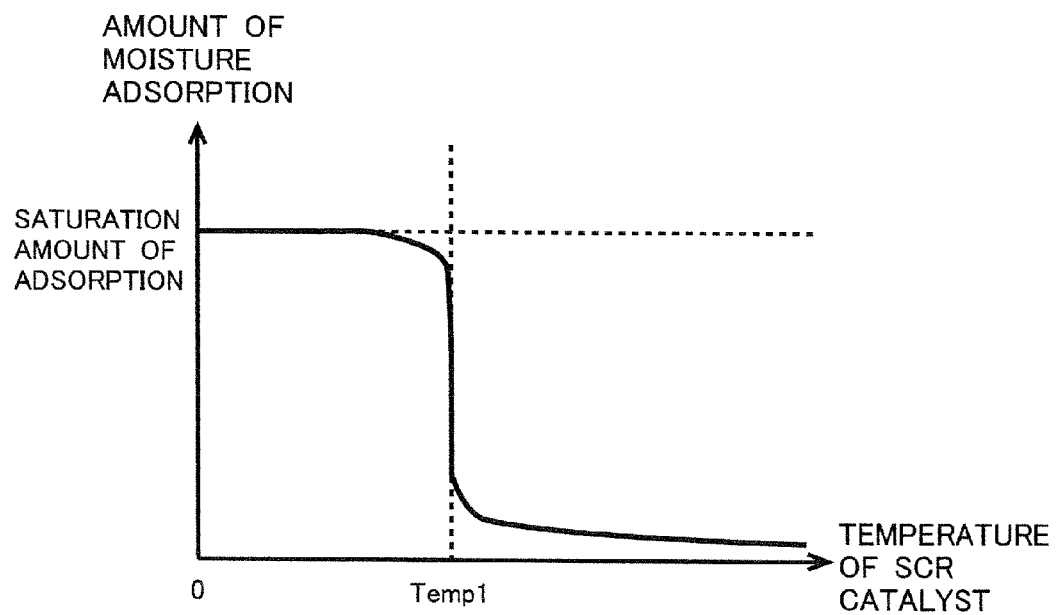
FIG. 3 is a view showing the relation between the temperature of the SCR catalyst and the amount of moisture adsorption of the SCR catalyst.

Here, note that the SCR catalyst may have adsorbed a certain amount of moisture, at the point in time when the operation of the internal combustion engine 1 is stopped. FIG. 3 is a view showing the relation between the temperature of the SCR catalyst and the amount of moisture adsorption of the SCR catalyst. In FIG. 3, when the temperature of the SCR catalyst is lower than a predetermined temperature Temp1 (e.g., 100 degrees C.), the SCR catalyst adsorbs an amount of moisture substantially equal to the saturation amount of adsorption thereof. In addition, when the temperature of the SCR catalyst is equal to or higher than the predetermined temperature Temp1, the SCR catalyst adsorbs a certain amount of moisture, though less than the saturation amount of adsorption. Accordingly, at the point in time when the operation of the internal combustion engine 1 is stopped, the SCR catalyst will have adsorbed an amount moisture corresponding to the temperature of the SCR catalyst.

Accordingly, in this embodiment, the amount of moisture adsorption of the SCR catalyst at the time of the stop of operation of the internal combustion engine 1 (i.e., "the amount of moisture adsorption at the time of engine stop") is obtained based on the temperature of the SCR catalyst at the time of the stop of operation of the internal combustion engine 1 and the relation as shown in FIG. 3, and the saturation period of time is obtained based on the amount of moisture adsorption at the time of engine stop and the relation as shown in FIG. 2.

Figure 4:
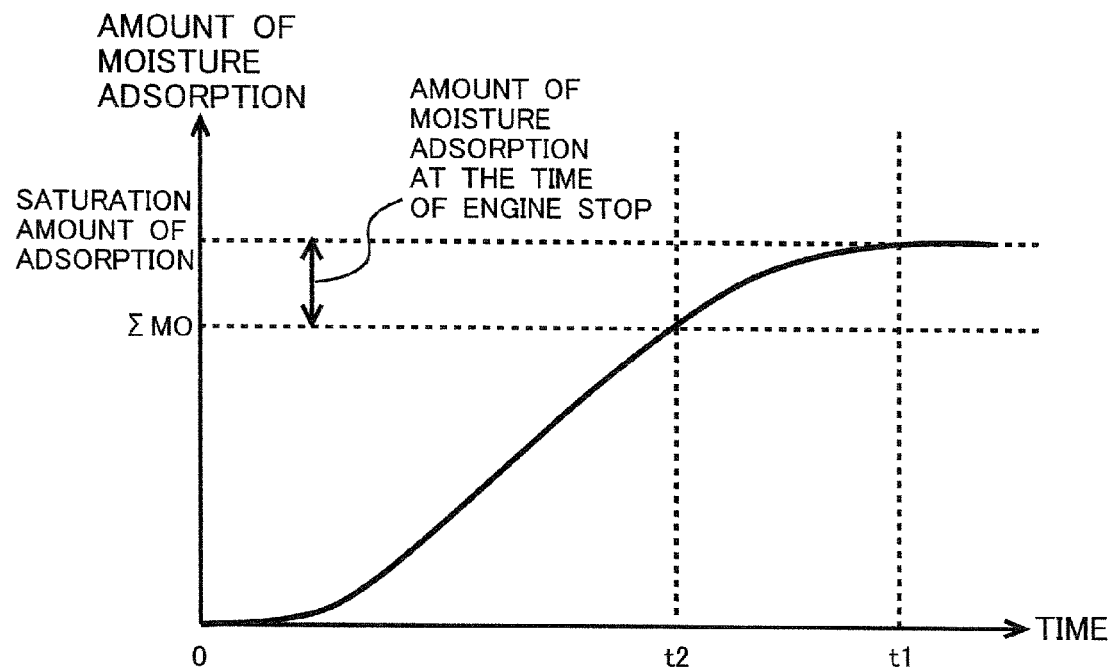
FIG. 4 is a view showing an example in which a saturation period of time is corrected based on the amount of moisture adsorption at a point in time when the operation of the internal combustion engine is stopped.

Specifically, the ECU 7 first obtains an amount of moisture $\Sigma$ MO which will be required until the moisture adsorption capacity of the SCR catalyst is saturated, by subtracting the amount of moisture adsorption at the time of engine stop from the saturation amount of adsorption, as shown in FIG. 4. Subsequently, the ECU 7 obtains a period of time (i.e., t2 in FIG. 4) which is required in order for the same amount of moisture as $\Sigma$ MO to be adsorbed to the SCR catalyst. Then, the ECU 7 sets the point in time t2 as the saturation period of time.

As an alternate method, in cases where the temperature of the SCR catalyst is equal to or less than the moisture adsorption temperature, the ECU 7 may obtain a period of time required for the same amount of moisture as the amount of moisture adsorption at the time of engine stop to be adsorbed to the SCR catalyst, and may set a difference between the period of time thus obtained and the point in time t1 in FIG. 2 as the saturation period of time. Here, note that in cases where the temperature of the SCR catalyst is equal to or less than the moisture adsorption temperature, the period of time required for the same amount of moisture as the amount of moisture adsorption at the time of engine stop to be adsorbed to the SCR catalyst is correlated with the temperature of the SCR catalyst at the time of the stop of operation of the internal combustion engine 1. Therefore, the period of time required for the same amount of moisture as the amount of moisture adsorption at the time of engine stop to be adsorbed to the SCR catalyst may be obtained by using, as a parameter, the temperature of the SCR catalyst at the time of the stop of operation of the internal combustion engine 1.

When the saturation period of time is set by any of the above-mentioned various kinds of methods, it will become possible to make an accurate estimation as to whether the moisture adsorption capacity of the SCR catalyst is saturated at the point in time when the internal combustion engine 1 is started, thus making it possible to enhance the accuracy of the dummy determination processing.

Figure 5:
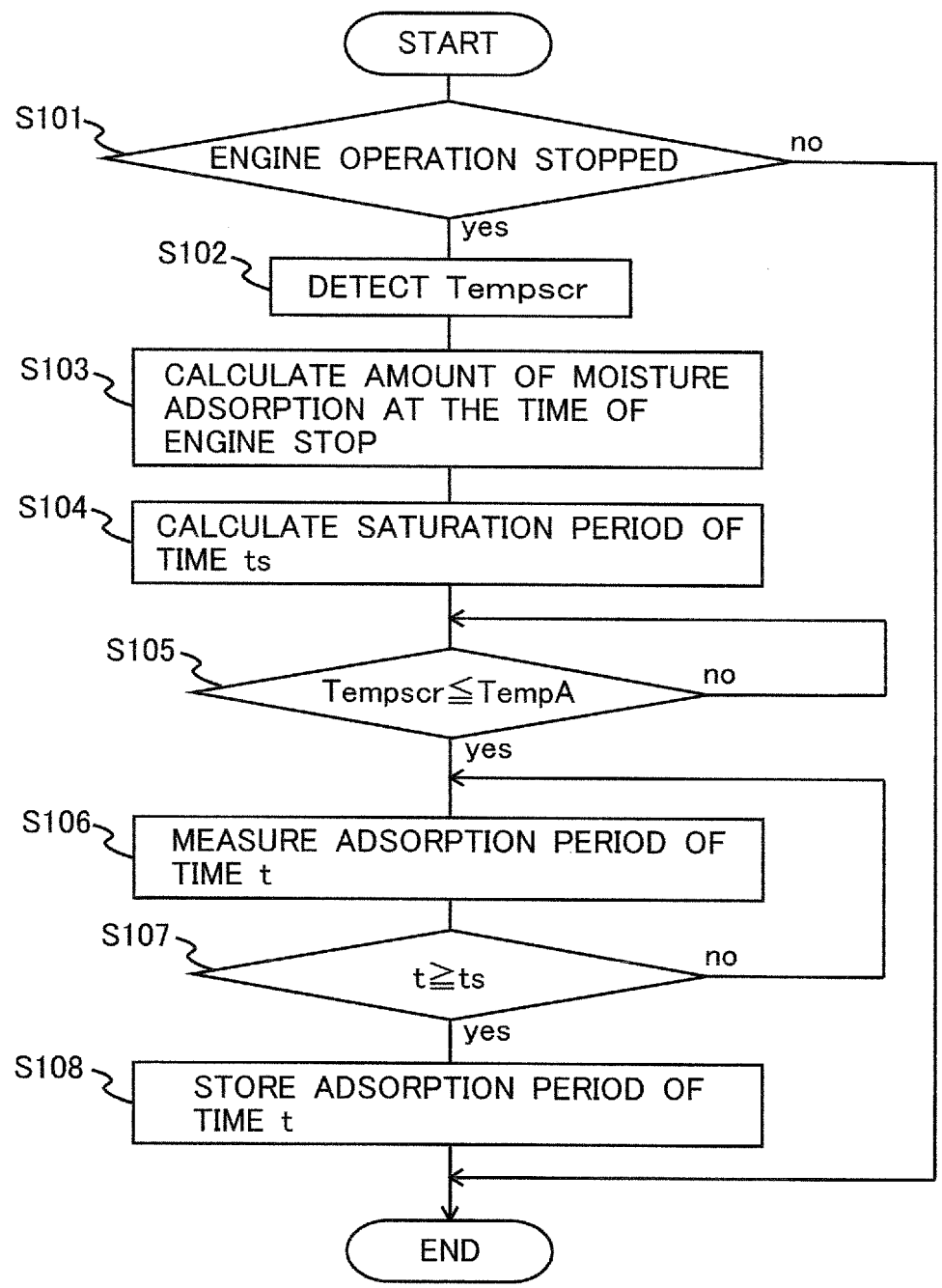
FIG. 5 is a flow chart showing a processing routine which is carried out by an ECU at the time of obtaining the amount of moisture adsorption of the SCR catalyst.
Figure 6:
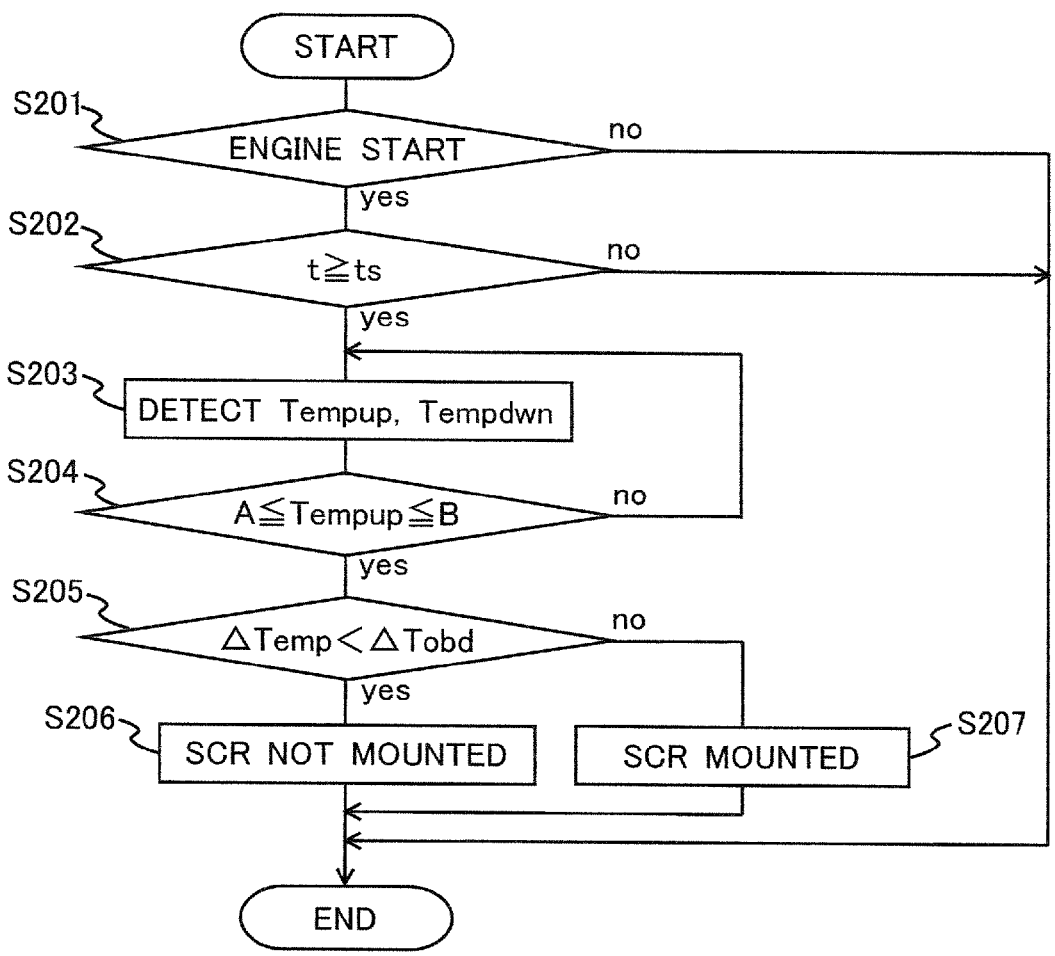
FIG. 6 is a flow chart showing a processing routine which is carried out by the ECU at the time of performing dummy determination processing.

In the following, an execution procedure of the dummy determination processing in this embodiment will be described in line with FIGS. 5, 6. FIG. 5 shows a processing routine for obtaining the amount of moisture adsorption of the SCR catalyst, which is executed by the ECU 7 when the operation of the internal combustion engine 1 is stopped. FIG. 6 shows a processing routine for carrying out the dummy determination processing, which is executed by the ECU 7 at the time of starting of the internal combustion engine 1. The processing routines of FIGS. 5, 6 have been stored in the ROM of the ECU 7 in advance.

In the processing routine of FIG. 5, first in the processing of step S101, the ECU 7 determines whether the operation of the internal combustion engine 1 was stopped. For example, when an ignition switch was turned off, the ECU 7 makes a determination that the operation of the internal combustion engine 1 was stopped.

In cases where a negative determination is made in the above-mentioned processing of step S101, the ECU 20 ends the execution of this routine. In cases where an affirmative determination is made in the above-mentioned processing of step S101, the routine of the ECU 7 goes to the processing of step S102.

In the processing of step S102, the ECU 7 detects a temperature Tempscr of the SCR catalyst at the time when the internal combustion engine 1 was stopped. The temperature Tempscr of the SCR catalyst referred to herein is a temperature of the SCR catalyst in the case of assuming that the third catalyst casing 6 receiving the SCR catalyst therein is arranged in the exhaust passage 3. In cases where the third catalyst casing 6 receiving the SCR catalyst therein is arranged in the exhaust passage 3, the temperature of the SCR catalyst is correlated with the measured value of the downstream side exhaust gas temperature sensor 11 (the downstream side exhaust gas temperature). Accordingly, the ECU 7 obtains the temperature Tempscr of the SCR catalyst by using, as a parameter, the measured value of the downstream side exhaust gas temperature sensor 11 (the downstream side exhaust gas temperature). At that time, the relation between the downstream side exhaust gas temperature and the temperature Tempscr of the SCR catalyst may have been obtained in advance, and the temperature of the SCR catalyst may be obtained based on the relation and the downstream side exhaust gas temperature.

In the processing of step S103, the ECU 7 calculates an amount of moisture adsorption of the SCR catalyst (an amount of moisture adsorption at the time of engine stop) at the point in time when the operation of the internal combustion engine 1 was stopped, based on the temperature Tempscr of the SCR catalyst obtained in the above-mentioned processing of step S102 and the above-mentioned relation as shown in FIG. 3. The amount of moisture adsorption at the time of engine stop referred to herein is an amount of moisture adsorption in the case of assuming that the third catalyst casing 6 receiving the SCR catalyst therein is arranged in the exhaust passage 3.

In the processing of step S104, the ECU 7 calculates a saturation period of time ts based on the amount of moisture adsorption at the time of engine stop obtained in the above-mentioned processing of step S103, and the above-mentioned relation as shown in FIG. 2. For example, the ECU 7 obtains the saturation period of time ts according to a method as mentioned in the above-mentioned explanation of FIG. 4. The saturation period of time ts referred to herein is a saturation period of time in the case of assuming that the third catalyst casing 6 receiving the SCR catalyst therein is arranged in the exhaust passage 3. The saturation period of time ts obtained in the processing of step S104 is stored into the backup RAM or the like.

In the processing of step S105, the ECU 7 detects again the temperature Tempscr of the SCR catalyst according to the same method as mentioned above in step S102, and determines whether the temperature Tempscr thus detected has decreased to a value equal to or less than a moisture adsorption temperature TempA. In cases where a negative determination is made in the processing of step S105 (i.e., Tempscr>TempA), the ECU 10 carries out the processing of step S105 in a repeated manner. On the other hand, in cases where an affirmative determination is made in the processing of step S105 (i.e., Tempscr≤TempA), the routine of the ECU 7 goes to the processing of step S106.

In the processing of step S106, the ECU 7 measures a period of time (an adsorption period of time) t in which the temperature Tempscr of the SCR catalyst has been equal to or less than the moisture adsorption temperature TempA during the stop of operation of the internal combustion engine 1. The adsorption period of time t referred to herein is an adsorption period of time in the case of assuming that the third catalyst casing 6 receiving the SCR catalyst therein is arranged in the exhaust passage 3.

In the processing of step S107, the ECU 7 makes a comparison between the adsorption period of time t measured in the above-mentioned processing of step S106 with the saturation period of time ts obtained in the above-mentioned processing of step S104, and determines whether the adsorption period of time t reached equal to or larger than the saturation period of time ts. In cases where a negative determination is made in the processing of step S107 (t<ts), the routine of the ECU 7 returns to step S106. On the other hand, in cases where an affirmative determination is made in the processing of step S107, the routine of the ECU 7 goes to the processing of step S102.

In the processing of step S108, the ECU 7 stores the adsorption period of time t into the backup RAM. After the execution of the processing of step S108, the ECU 7 ends the execution of this routine. Here, note that in cases where the internal combustion engine 1 was started in the middle of the execution of this routine, the ECU 7 stores the adsorption period of time t at that point in time into the backup RAM or the like, and then ends the execution of this routine.

Subsequently, in the processing routine of FIG. 6, in the processing of step S201, the ECU 7 determines whether the internal combustion engine 1 has been started. Specifically, a starter switch was turned on, and then, when the engine rotational speed became subsequently equal to or larger than a fixed value (e.g., an idling speed), the ECU 7 makes a determination that the internal combustion engine 1 was started. In cases where a negative determination is made in the processing of step S201, the ECU 7 carries out the processing of step S201 in a repeated manner. On the other hand, in cases where an affirmative determination is made in the processing of step S201, the routine of the ECU 7 goes to the processing of step S202.

In the processing of step S202, the ECU 7 reads in the saturation period of time ts and the adsorption period of time t stored in the backup RAM or the like, and determines whether the adsorption period of time t is equal to or larger than the saturation period of time ts.

In cases where a negative determination is made in the processing of step S202 (t<ts), the moisture adsorption capacity of the SCR catalyst to be arranged in the exhaust passage 3 will not be saturated. As a result, if the SCR catalyst is arranged in the exhaust passage 3, a phenomenon will occur in which the SCR catalyst adsorbs moisture in the exhaust gas after the starting of the internal combustion engine 1. When the phenomenon in which the SCR catalyst adsorbs moisture in the exhaust gas occurs after the starting of the internal combustion engine 1, even in cases where the SCR catalyst is arranged in the exhaust passage 3, there will be a possibility that the temperature difference between the upstream side exhaust gas temperature and the downstream side exhaust gas temperature may become smaller than the threshold value. Accordingly, in cases where a negative determination is made in the processing of step S202, the ECU 7 ends the execution of this routine, without carrying out the dummy determination processing.

On the other hand, in cases where an affirmative determination is made in the processing of step S202 (t≥ts), the moisture adsorption capacity of the SCR catalyst to be arranged in the exhaust passage 3 will be saturated. As a result, if the SCR catalyst is arranged in the exhaust passage 3, a phenomenon will not occur in which the SCR catalyst adsorbs moisture in the exhaust gas, but another phenomenon will occur in which moisture desorbs from the SCR catalyst, after the starting of the internal combustion engine 1. When the phenomenon occurs in which moisture desorbs from the SCR catalyst after the starting of the internal combustion engine 1, the temperature difference between the upstream side exhaust gas temperature and the downstream side exhaust gas temperature becomes large. Accordingly, in cases where an affirmative determination is made in the processing of S202, the ECU 7 carries out the dummy determination processing in the processing of steps S203 through S207.

In the processing of step S203, the ECU 7 reads in the measured value Tempup of the upstream side exhaust gas temperature sensor 10 (the upstream side exhaust gas temperature) and the measured value Tempdwn of the downstream side exhaust gas temperature sensor 11 (the downstream side exhaust gas temperature).

In the processing of step S204, the ECU 7 determines whether the upstream side exhaust gas temperature Tempup read in the processing of step S203 falls within a predetermined temperature range (i.e., a temperature range which is equal to or higher than A and is equal to or lower than B). The temperature range referred to herein is a temperature range in which the SCR catalyst is able to desorb moisture easily, for example, a range from 100 degrees C. to 130 degrees C. In cases where a negative determination is made in the processing of step S204, the routine of the ECU 7 returns to the processing of step S203. On the other hand, in cases where an affirmative determination is made in the processing of step S204, the routine of the ECU 7 goes to the processing of step S205.

In the processing of step S205, the ECU 7 calculates a temperature difference ΔTemp (=Tempup−Tempdwn) between the upstream side exhaust gas temperature Tempup and the downstream side exhaust gas temperature Tempdwn detected in the processing of step S203, and determines whether the temperature difference ΔTemp is less than a threshold value ΔTobd.

In cases where an affirmative determination is made in the processing of step S205 (ΔTemp<ΔTobd), the routine of the ECU 7 goes to the processing of step S206, in which a determination is made that the third catalyst casing 6 receiving the SCR catalyst therein is not arranged in the exhaust passage 3 (i.e., the SCR catalyst is not mounted). In that case, the ECU 7 may prompt the driver of the vehicle to mount an SCR catalyst, by turning on an alarm lamp, etc., which is arranged in the interior of a passenger compartment of the vehicle.

On the other hand, in cases where a negative determination is made in the processing of step S205 (ΔTemp≥ΔTobd), the routine of the ECU 7 goes to the processing of step S207, in which a determination is made that the third catalyst casing 6 receiving the SCR catalyst therein is arranged in the exhaust passage 3 (i.e., the SCR catalyst is mounted).

As described above, a determination unit according to the present invention is achieved by carrying out the processing routine of FIGS. 5, 6 by means of the ECU 7. As a result, the dummy determination processing will no longer be carried out, in cases where there is a possibility that the downstream side exhaust gas temperature may be made high due to the moisture adsorption reaction in the SCR catalyst (i.e., in cases where the temperature difference between the upstream side exhaust gas temperature and the downstream side exhaust gas temperature may become small). Accordingly, it is possible to prevent an incorrect determination from being made that the SCR catalyst is not arranged in the exhaust passage 3, in spite of the fact that the SCR catalyst is arranged in the exhaust passage 3. In addition, when a remarkable difference appears between the temperature difference in the case where the SCR catalyst is arranged in the exhaust passage 3 and the temperature difference in the case where the SCR catalyst is not arranged in the exhaust passage 3, the dummy determination processing is carried out, as a result of which the determination accuracy of the dummy determination processing can also be enhanced.

Here, note that in the processing of step S205 in the processing routine of FIG. 6, the ECU 7 may obtain an average value of the upstream side exhaust gas temperature Tempup and an average value of the downstream side exhaust gas temperature Tempdwn at the time when the upstream side exhaust gas temperature Tempup falls within the above-mentioned predetermined temperature range, and may determine whether a difference between them is less than the threshold value ΔTobd.

In addition, in the processing of step S205, the ECU 7 may integrate the temperature difference ΔTemp between the upstream side exhaust gas temperature Tempup and the downstream side exhaust gas temperature Tempdwn at the time when the upstream side exhaust gas temperature Tempup falls within the above-mentioned predetermined temperature range, and may determine whether the integrated value thus obtained is less than another threshold value. According to these methods, it is possible to enhance the determination accuracy of the dummy determination processing to a further extent.

Here, note that in cases where the $NO_X$ sensor is mounted on the exhaust passage 3 at the downstream side of a location where the SCR catalyst is to be arranged, there is also considered a method in which a determination is made that the SCR catalyst has been removed, on condition that a difference between an amount of $NO_X$ flowing into the location (an amount of inflow $NO_X$), and an amount of $NO_X$ flowing out of the location (an amount of outflow $NO_X$) is less than a threshold value.

However, such a method using an $NO_X$ sensor can not be carried out until the SCR catalyst is activated after starting of the internal combustion engine 1. On the other hand, the method described in this embodiment can be carried out before the SCR catalyst is activated after starting of the internal combustion engine, so it is possible to detect removal of the SCR catalyst at an early stage after engine starting.

Moreover, in a construction in which an NSR catalyst is arranged at the upstream side of an SCR catalyst, the amount of $NO_X$ flowing into the SCR catalyst becomes small, and hence, an incorrect determination resulting from a measurement error of an $NO_X$ sensor may be caused. On the other hand, the method described in this embodiment is carried out when a difference between a case where the SCR catalyst is arranged in the exhaust passage 3 and a case where the SCR catalyst is not arranged there appears notably, so that an incorrect determination resulting from a measurement error of the upstream side exhaust gas temperature sensor 10 or the downstream side exhaust gas temperature sensor 11 is hard to occur.

Although in this embodiment, there has been described an example in which dummy determination processing is carried out by making use of the temperature difference between the upstream side exhaust gas temperature and the downstream side exhaust gas temperature as a parameter, the dummy determination processing may be carried out by making use of the ratio of the downstream side exhaust gas temperature with respect to the upstream side exhaust gas temperature as a parameter. For example, when the ratio of the downstream side exhaust gas temperature with respect to the upstream side exhaust gas temperature is equal to or less than a threshold value, the ECU 7 may make a determination that the third catalyst casing 6 receiving the SCR catalyst therein is arranged in the exhaust passage 3, whereas when the above-mentioned ratio is larger than the threshold value, the ECU 7 may make a determination that the third catalyst casing 6 receiving the SCR catalyst therein is not arranged in the exhaust passage 3.

In this embodiment, there has also been described an example in which a determination is made as to whether an SCR catalyst, which is to be arranged in an exhaust passage of a spark ignition internal combustion engine which can be operated with a mixture of a lean air fuel ratio, is removed or not, but even in a construction in which an SCR catalyst and an addition valve, which serves to add an additive agent, e.g., ammonia or a precursor of ammonia, into an exhaust gas flowing into the SCR catalyst, are arranged in an exhaust passage of a compression ignition type internal combustion engine (diesel engine) which is operated with a mixture of a lean air fuel ratio, removal of the SCR catalyst can be determined according to the same method.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-007630, filed on Jan. 20, 2014, which is hereby incorporated by reference herein in its entirety.

What is claimed is:

1. A control apparatus for an internal combustion engine comprising:
    an alarm lamp;
    an upstream side temperature sensor that detects a temperature of exhaust gas flowing into a location where a selective catalytic reduction catalyst is to be arranged in an exhaust passage of the internal combustion engine;
    a downstream side temperature sensor that detects a temperature of exhaust gas flowing out of the location where the selective catalytic reduction catalyst is to be arranged in the exhaust passage of the internal combustion engine; and
    an electronic control unit operatively connected to the alarm lamp, the electronic control unit configured to:
    carry out dummy determination processing to determine a presence or absence of the selective catalytic reduction catalyst mounted at the location, based on a parameter correlated with a temperature difference between the temperature measured by the upstream side temperature sensor and the temperature measured by the downstream side temperature sensor after starting of the internal combustion engine;
    calculate a temperature of the selective catalytic reduction catalyst based on the temperature measured by the downstream side temperature sensor; and
    measure a first period of time in which the calculated temperature of the selective catalytic reduction catalyst is equal to or less than a fixed temperature in a period of time from the last stop of the internal combustion engine to the current starting thereof, and to carry out the dummy determination processing when the first period of time is equal to or larger than a predetermined period of time, but not to carry out the dummy determination processing when the first period of time is less than the predetermined period of time,
    wherein the electronic control unit activates the alarm lamp upon determining the absence of the selective catalytic converter at the location.

2. The control apparatus for an internal combustion engine as set forth in claim 1, wherein
    the fixed temperature and the predetermined period of time are set in such a manner that when the first period of time becomes equal to or larger than the predetermined period of time, a moisture adsorption capacity of the selective catalytic reduction catalyst is saturated.

3. The control apparatus for an internal combustion engine as set forth in claim 2, wherein
    the fixed temperature is a maximum value of a temperature at which the selective catalytic reduction catalyst is able to adsorb moisture; and
    the predetermined period of time is a period of time taken until the moisture adsorption capacity of the selective catalytic reduction catalyst is saturated.

4. The control apparatus for an internal combustion engine as set forth in claim 3, wherein
    the predetermined period of time is changed according to an amount of moisture adsorption of the selective catalytic reduction catalyst at the time of the last stop of operation of the internal combustion engine.

5. The control apparatus for an internal combustion engine as set forth in claim 2, wherein
    the predetermined period of time is changed according to an amount of moisture adsorption of the selective catalytic reduction catalyst at the time of the last stop of operation of the internal combustion engine.

* * * * *